US011025602B1

(12) United States Patent
Machani et al.

(10) Patent No.: US 11,025,602 B1
(45) Date of Patent: Jun. 1, 2021

(54) METHOD, APPARATUS AND COMPUTER PROGRAM PRODUCT FOR PERFORMING AUTHENTICATION USING MULTIPLE USER DEVICES

(71) Applicant: EMC IP Holding Company LLC, Hopkinton, MA (US)

(72) Inventors: Salah Machani, Burlington, MA (US); Naveen Naga Sunkavally, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 15/395,969

(22) Filed: Dec. 30, 2016

(51) Int. Cl.
*H04L 29/06* (2006.01)
*H04W 12/06* (2021.01)

(52) U.S. Cl.
CPC ...... *H04L 63/0492* (2013.01); *H04L 63/0281* (2013.01); *H04L 63/083* (2013.01); *H04W 12/06* (2013.01)

(58) Field of Classification Search
CPC ....... H04L 63/08; H04L 63/20; H04L 63/107; H04L 63/083; H04L 63/0281; H04L 63/0492; H04L 63/105; H04L 29/12594; H04W 12/06
See application file for complete search history.

(56) References Cited

U.S. PATENT DOCUMENTS

| | | | |
|---|---|---|---|
| 10,231,128 B1* | 3/2019 | Ziraknejad | H04L 63/0428 |
| 2005/0221829 A1* | 10/2005 | Nishida | G01S 11/06 |
| | | | 455/440 |
| 2010/0048167 A1* | 2/2010 | Chow | H04L 63/105 |
| | | | 455/410 |
| 2013/0024542 A1* | 1/2013 | Keller | G05B 19/0428 |
| | | | 709/217 |
| 2014/0188348 A1* | 7/2014 | Gautama | B60W 10/30 |
| | | | 701/48 |
| 2014/0282877 A1* | 9/2014 | Mahaffey | H04W 12/08 |
| | | | 726/3 |
| 2014/0289827 A1* | 9/2014 | Tang | H04L 63/08 |
| | | | 726/6 |
| 2015/0180716 A1* | 6/2015 | Aminzade | H04L 41/0816 |
| | | | 726/4 |
| 2015/0229650 A1* | 8/2015 | Grigg | H04L 63/105 |
| | | | 726/7 |
| 2017/0039837 A1* | 2/2017 | Hawkins | H04W 4/029 |
| 2018/0027518 A1* | 1/2018 | Sugumaran | H04W 64/00 |
| | | | 370/328 |

* cited by examiner

*Primary Examiner* — Harunur Rashid
(74) *Attorney, Agent, or Firm* — Krishnendu Gupta; Lesley Leonessa

(57) ABSTRACT

There are disclosed techniques for use in authentication. The techniques including setting a proximity threshold that represents a distance by which a first device and a second device can be separated without impacting authentication such that the selection is dependent on one or more environmental factors associated with the first device. The techniques also perform a comparison between the proximity threshold and a distance between the first and the second devices to produce a comparison result indicating whether the first device is proximate to the second device. Finally, based on the comparison result, the techniques determine whether to grant authentication such that at least one factor in the determination is the proximity of the first and the second devices.

15 Claims, 3 Drawing Sheets

METHOD, APPARATUS AND COMPUTER PROGRAM PRODUCT FOR PERFORMING AUTHENTICATION USING MULTIPLE USER DEVICES

TECHNICAL FIELD

The present invention relates to authentication. More particularly, the present invention relates to a method, an apparatus and a computer program product for performing authentication using multiple user devices.

BACKGROUND OF THE INVENTION

In many authentication systems, users are required to enter static passwords in order to prove their identity so as to gain access to a protected resource. Different applications, accounts or other types of protected resources associated with a given user may each require entry of distinct alphanumeric password, thereby necessitating that the user remember multiple such passwords in order to access the corresponding resources. This is not only unduly burdensome for the user, but can also undermine security in that the user will often write down the passwords or otherwise make them vulnerable to inadvertent disclosure.

Numerous other techniques may also be used by authentication systems to verify the identity of a user. One such approach is to detect the presence of multiple electronic user devices in a particular area such that a trusted set of mobile devices in proximity to a primary user access device may provide some level of assurance about the identity and authenticity of the user. For example, if one or more trusted devices remain within a predefined distance of the primary user access device the user may be deemed to be authentic. The continuous presence of these trusted devices in proximity to the primary user access device has the advantage of being able to provide continuous user authentication and allow for single sign-on to multiple applications and resources in a federated environment.

Unfortunately, there are also deficiencies in connection with this proximity based approach. For example, it may be difficult in some environments to accurately determine the distance between the primary device and the trusted devices. It should be understood that different environments may adversely affect distance calculations between the devices. Further, in order to determine whether the devices are in close proximity, a threshold is required to be set that represents a predefined maximum distance by which the devices should be separated such that devices shall be deemed to be proximate to one another if the determined distance between devices is less than the threshold. However, the setting of a threshold is not a straight forward task in that the threshold may be suitable in one instance but entirely unsuitable in another instance. The current approach deals with this matter by allowing a user to set the threshold and adjust it as needed. However, this approach of asking the user to adjust the threshold takes away the frictionless and usability benefits of the systems and make it less reliable and less secure if the user chooses the wrong threshold. There is, therefore, a need to address at least some of these deficiencies.

SUMMARY OF THE INVENTION

There is disclosed a method, comprising: in response to receiving an authentication request originating from a first device, selecting, by processing circuitry, a proximity threshold representing a distance by which the first device and a second device can be separated without impacting authentication, wherein the selection of the proximity threshold is dependent on one or more environmental factors associated with the first device; determining, by processing circuitry, a distance between the first device and the second device; performing, by processing circuitry, a comparison between the proximity threshold and the distance, wherein the performed comparison produces a comparison result indicating whether the first device is proximate to the second device; and based on the comparison result, determining, by processing circuitry, whether to grant authentication such that at least one factor in the determination is the proximity of the first device and the second device.

There is also disclosed an apparatus, comprising: memory; and processing circuitry coupled to the memory, the memory storing instructions which, when executed by the processing circuitry, cause the processing circuitry to: in response to receiving an authentication request originating from a first device, select a proximity threshold representing a distance by which the first device and a second device can be separated without impacting authentication, wherein the selection of the proximity threshold is dependent on one or more environmental factors associated with the first device; determine a distance between the first device and the second device; perform a comparison between the proximity threshold and the distance, wherein the performed comparison produces a comparison result indicating whether the first device is proximate to the second device; and based on the comparison result, determine whether to grant authentication such that at least one factor in the determination is the proximity of the first device and the second device.

There is also disclosed a computer program product having a non-transitory computer readable medium which stores a set of instructions, the set of instructions, when carried out by processing circuitry, causing the processing circuitry to perform a method, the method comprising: in response to receiving an authentication request originating from a first device, selecting a proximity threshold representing a distance by which the first device and a second device can be separated without impacting authentication, wherein the selection of the proximity threshold is dependent on one or more environmental factors associated with the first device; determining a distance between the first device and the second device; performing a comparison between the proximity threshold and the distance, wherein the performed comparison produces a comparison result indicating whether the first device is proximate to the second device; and based on the comparison result, determining whether to grant authentication such that at least one factor in the determination is the proximity of the first device and the second device.

BRIEF DESCRIPTION OF THE DRAWINGS

The foregoing and other objects, features and advantages will be apparent from the following description of particular embodiments of the invention, as illustrated in the accompanying figures in which like reference characters refer to the same parts throughout the different views.

DETAILED DESCRIPTION

Figure 1:
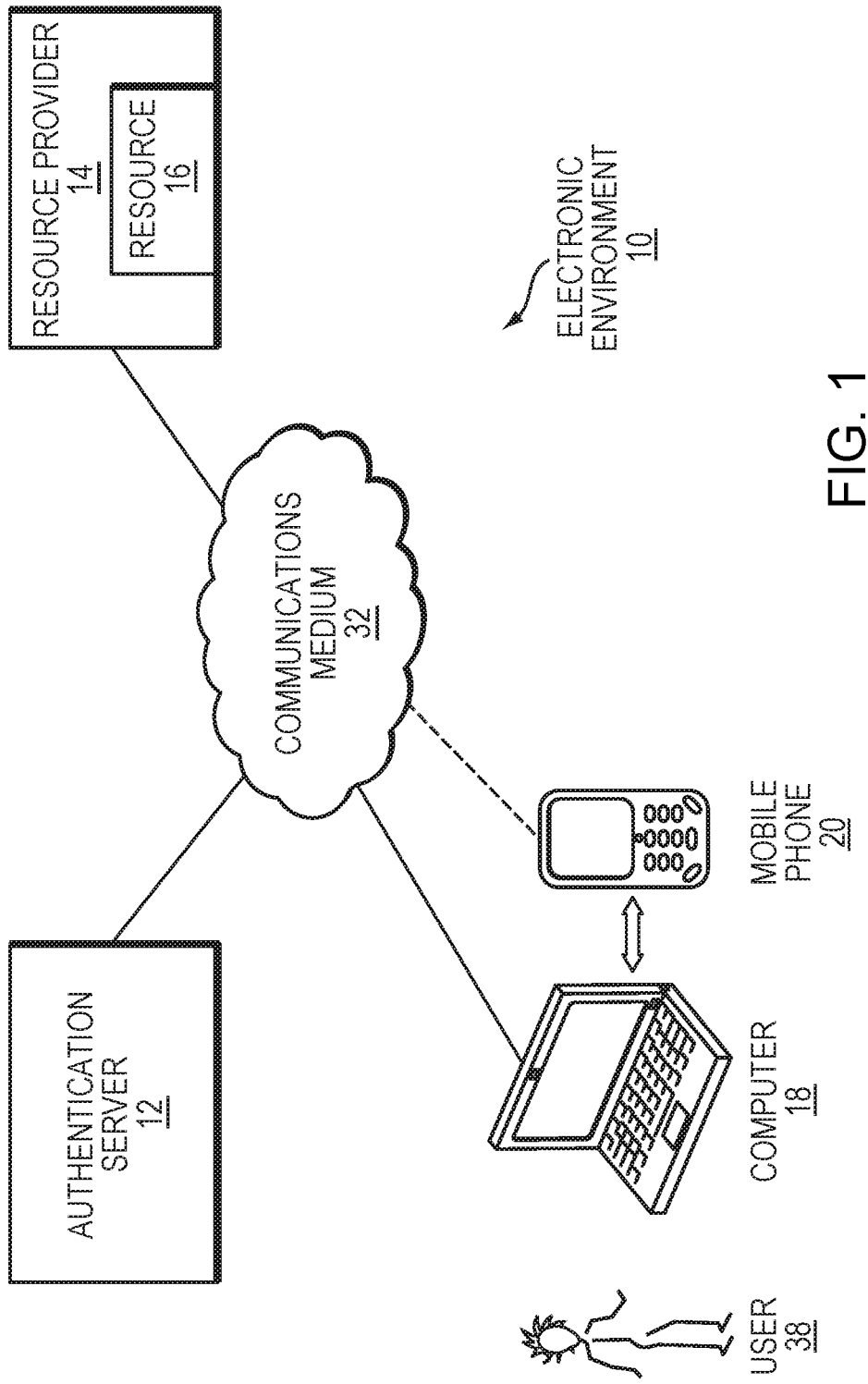
FIG. 1 is a block diagram illustrating an example electronic environment for carrying out the improved technique.

FIG. 1 illustrates an example electronic environment 10 for carrying out the improved technique. Electronic environment 10 includes an authentication server 12, a resource provider 14, a computer 18, a mobile phone 20, and communications medium 32.

Communication medium 32 provides network connections between authentication server 12, resource provider 14, and computer 18. In some arrangements, communications medium 32 also provides network connections between authentication server 12 and mobile phone 20. Communications medium 32 may implement a variety of protocols such as TCP/IP, UDP, ATM, Ethernet, Fibre Channel, combinations thereof, and the like. Furthermore, communications media 32 may include various components (e.g., cables, switches/routers, gateways/bridges, NAS/SAN appliances/nodes, interfaces, etc.). Moreover, the communications medium 32 are capable of having a variety of topologies (e.g., queue manager-and-spoke, ring, backbone, multi drop, point to-point, irregular, combinations thereof, and so on).

Authentication server 12 provides verification of the authenticity of user 38 on behalf of resource provider 14 based on one or more factors. Further details of authentication server 12 will be described with respect to FIG. 2.

Resource provider 14 includes a server that hosts a web site from which user 38 may access resource 16. For example, if resource provider 14 represents a banking institution, resource 16 may be a bank account through which user 38 accesses money.

Computer 18 provides user 38 access to resource provider 14 via communications medium 32. Computer 18 is a laptop as illustrated in FIG. 1; in some arrangements, however, computer 18 takes the form of a desktop, a tablet, a smartphone, a personal digital assistant, or a netbook.

Mobile phone 20 is able to be detected by computer 18. In some arrangements, mobile phone 18 may be a tablet, a netbook, a personal digital assistant, or any portable device that can be detected by computer 18 via Bluetooth®, universal serial bus (USB), RF, Line of Site®, Airdrop®, Bonjour®, wireless IEEE 802.11(a, b, g, n), or another connection.

During operation, the computer 18 submits a request on behalf of the user 38 to access the resource 16. The resource provider 14 responds to the request by asking the authentication server 12 to verify the identity of the user 38. For example, as discussed above, if the resource 16 is a bank account, the identity of the user 38 is required to be verified. If the identity of the user 38 is verified, the user 38 will gain access to the account. If not, the user 38 is denied access to the account.

Authentication server 12 authenticates the user 38 by performing one or more authentication operations to verify the identity of the user 38. In one particular embodiment, the authentication server 12 verifies the identity by determining a distance between the computer 18 and the mobile device 20 of the user 38 and comparing the distance to a proximity threshold. The comparison may be one factor in determining whether to authenticate the user 38. For example, if the computer 18 and the mobile device 20 are located in close proximity relative to one another the authentication server 12 may authenticate the user 38.

The distance between the computer 18 and the mobile phone 20 may be determined, for example, using received signal strength indication (RSSI) techniques. RSSI techniques involve measuring the signal strength of the arriving radio signal at the receiver. Knowing the power at which the signal was transmitted from the transmitter, the propagation characteristics of that particular radio signal in air and with some a priori knowledge of the environment it is possible to calculate approximately where the transmission originated based on how attenuated the signal is at the receiver.

As briefly discussed above, it should, however, be noted that some approaches to determining distance are sensitive to environmental conditions such as, for example, device hardware, physical structures and their composition (e.g. metal), wireless interference from other networks, and locations of devices. The disclosure herein discloses several approaches to dealing with this sensitivity.

In one embodiment, instead of relying on fixed signal strength values, relative signal strength values may be used. Here, when the user 38 first authenticates or during a setup process, a baseline signal strength value is established defining what it means for the user 38 to be near the computer 18 (and subsequently a proximity threshold is set relative to this baseline as will be discussed below). For example, in a particular environment, the baseline signal strength may signify that the mobile device 20 and the computer 18 are close to one another. Such an approach helps to assist in neutralizing many environmental factors such as variations in device hardware and physical structures. Also, certain key events, such as re-authenticating, can automatically trigger the determination of a new baseline.

Additionally, in another embodiment, the distance can be determined using bidirectional signal strength measurements. For instance, suppose the computer 18 measures the RSSI of the mobile phone 20, the mobile phone 20 in this instance can also measure the RSSI of the computer 18. By combining both measurements, it is possible to improve accuracy and smooth out noisy data.

Furthermore, in another embodiment, the distance can be determined using the signal strength measurements of all available user devices instead of just ones directly reachable by the computer 18. Suppose, for instance, the computer 18 can measure the signal strength of the mobile phone 20 but it cannot directly communicate with a smart watch or fitness band that the user 38 is wearing. The mobile phone 20, however, can communicate with the wearable device. This in effect creates a network of user devices and all of their signal strength measurements can be combined to provide greater certainty as to the user's presence in front of the computer 18. For example, if the user 38 left the mobile phone 20 next to the computer 18 but stepped away wearing a smart watch, the authentication system 12 can determine that the user 38 has stepped out by virtue of the signal strength of the watch being weak, even if the computer 18 cannot directly communicate with the watch.

The authentication system 12 is also configured to determine a proximity threshold representing a maximum distance by which the computer 18 and the mobile device 20 can be separated without impacting authentication based on one or more environmental factors associated with the computer 18. For example, several contextual profiles are predefined in the authentication system 12 with default proximity thresholds. At the outset, the user 38 activates and adjusts the profiles as well as assigning rules for when certain profiles become active based on factors such as the presence of certain wireless networks, GPS location, time of day, or the presence of certain IoT devices. Once the authentication server determines one of these factors, it selects the profile and the associated proximity threshold suitable for comparing with the determined distance between the computer 18 and the mobile phone 20.

Furthermore, it should be understood that users have different behavioral patterns when it comes to the amount of time they spend at their desk, in the halls talking to their colleagues, in meeting rooms, working from home, travel on business, in industry conferences, working from customer sites, or remotely from coffee shops, hotel lobbies, airport lounges, etc. For each one of these situations, the user 38 may expect authentication-related actions, such as auto-lock and auto-unlock, on the computer 18 to be adaptive to the situation and risk. For example, if the user 38 is sitting in hotel lobby and gets up to walk up to another part of the hotel, the user 38 may require the screen auto-lock to be activated as soon as he walks three to four feet away. If on the other hand, the user 38 is sitting at his desk at home and walks to another part of the home, the user 38 may want the screen to auto-lock only if he walks away for more than ten feet or for more than ten minutes.

To this end, as the authentication system 12 is run over time it builds up data about the users 38 behavior in each environment. This data includes the time of day the user 38 is at that location, user movements, the time spent working on the computer 18, etc. As a result, based on the user behavior, the authentication system 12 can automatically adjust proximity thresholds and the time lapse before the auto-lock or auto-unlock is activated.

Authentication server 12 is also configured to perform a comparison between the distance and the proximity threshold to produce a comparison result indicating whether the computer 18 and the mobile device 20 are in close proximity relative to one another. For example, the comparison result indicates whether the computer 18 and the mobile phone 20 are in the vicinity of each other. If the distance is within the threshold the authentication server 12 authenticates the user 38. If the distance is outside the threshold the authentication server 12 may refuse authentication or challenge the user 38 further.

Further details of authentication server 12 are provided below with respect to FIG. 2.

Figure 2:
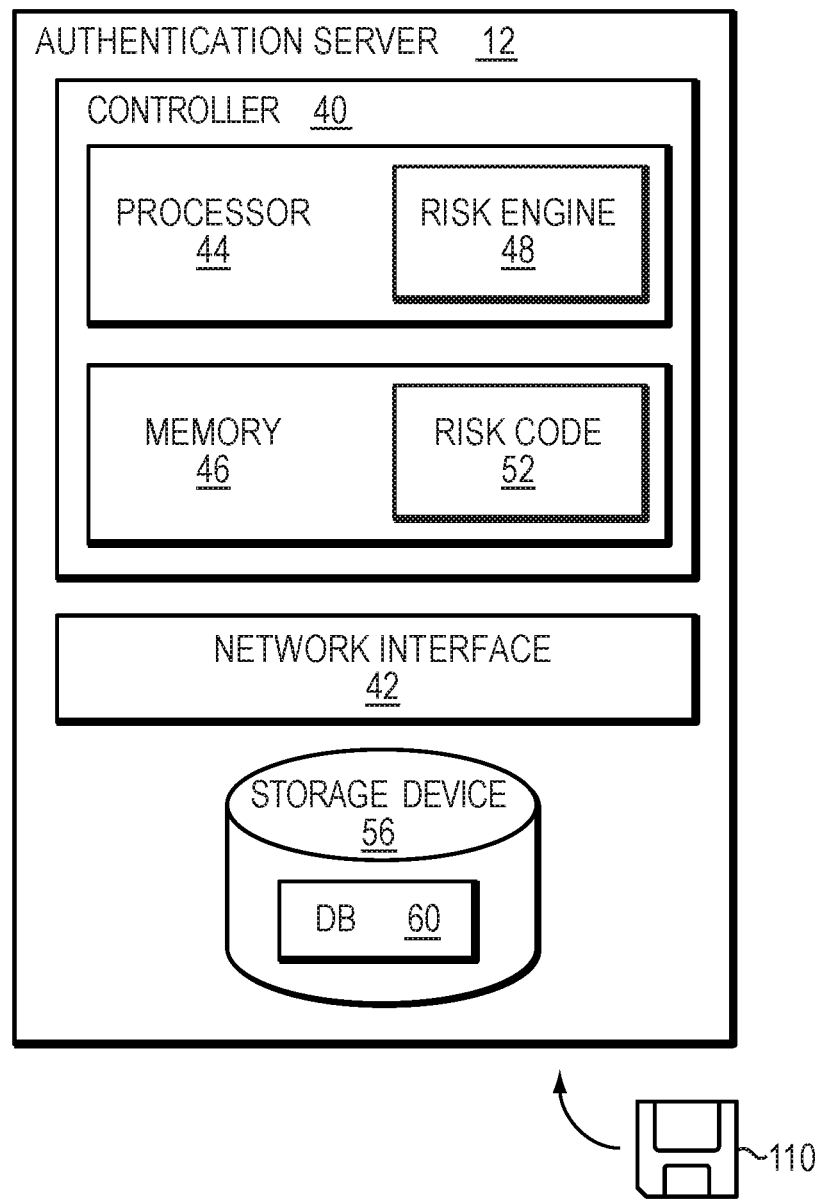
FIG. 2 is a block diagram illustrating an example authentication server within the electronic environment shown in FIG. 1.

FIG. 2 illustrates authentication server 12. Authentication server 12 includes controller 40, which in turn includes processor 44 and memory 46, network interface 42, and storage device 56.

Network interface 42 takes the form of an Ethernet card; in some arrangements, network interface 42 takes other forms including a wireless receiver and a token ring card.

Memory 46 generally takes the form of, e.g., random access memory, flash memory or a non-volatile memory. Memory 46 is configured to store code which includes risk code 52 configured to generate a risk score based on various factors which may include a comparison between the threshold and the distance as discussed above.

Processor 44 takes the form of, but is not limited to, Intel or AMD-based MPUs, and can include a single or multi-cores each running single or multiple threads. Processor 44 is coupled to memory 46 and is configured to execute instructions from risk code 52. Processor 44 includes risk engine 48.

Storage device 56 is configured to store database 60, which in turn stores values of attributes associated with authentication requests, users 38, etc. collected over time. Further, the storage device 56 may comprise multiple profiles associated with respective thresholds.

During operation, processor 44 receives, via network interface 42, request from user 38 which includes an identifier of an owner of an account with resource provider 14 (see FIG. 1). Upon receiving the request, the processor 44 performs an operation to determine the distance between the computer 18 and the mobile phone 20. For example, the processor 44 may determine the distance based on the RSSI as discussed above. Processor 44 also evaluates the profiles in the storage device 56 to determine a suitable threshold based on factors (e.g., environmental factors). Processor 44 performs a comparison between the distance and threshold and the risk engine 48 issues a high or low risk score depending on the comparison. Processor 44 determines whether to authenticate the user 38 based on the risk score.

Figure 3:
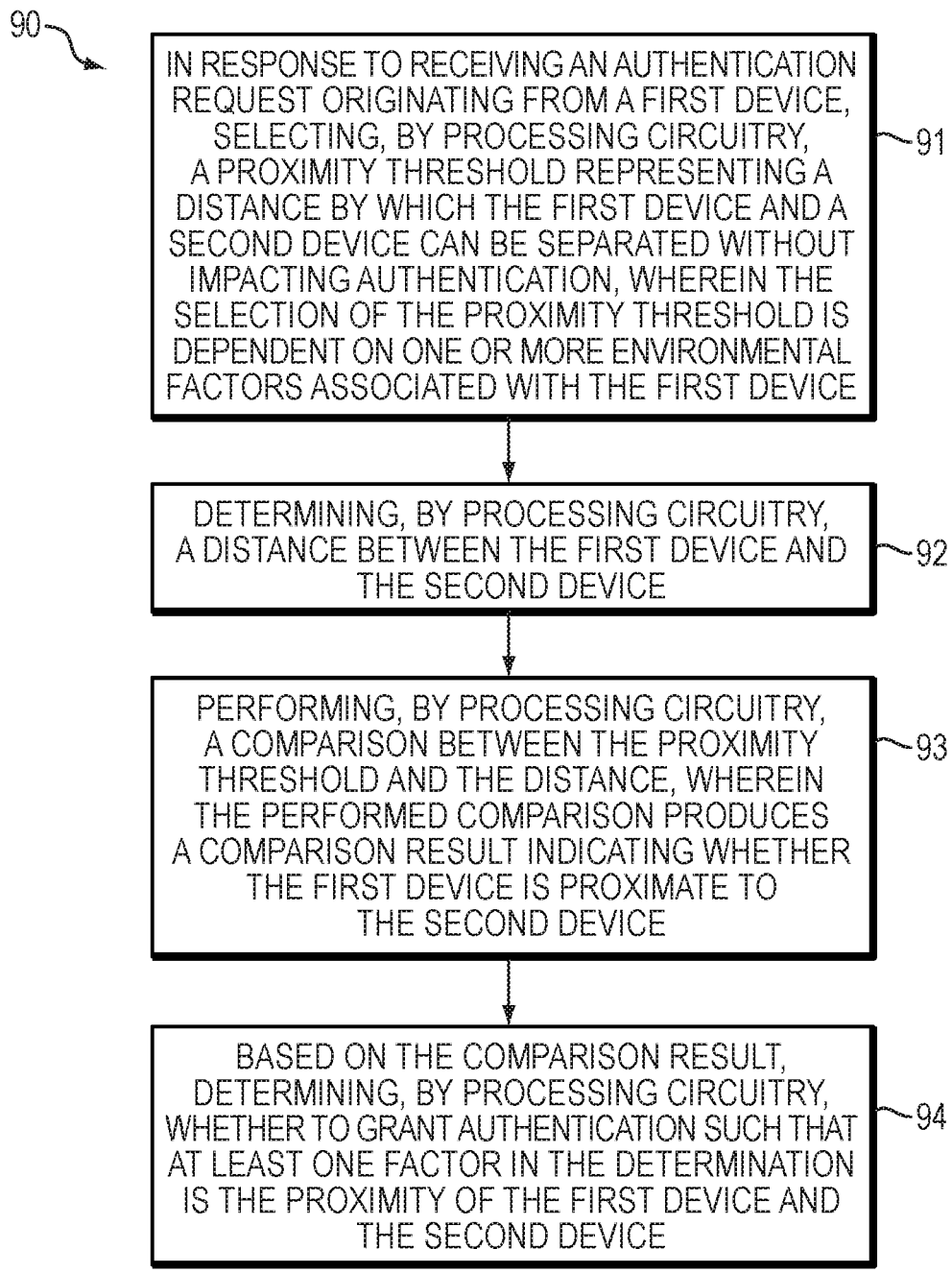
FIG. 3 is a flow chart illustrating a method of carrying out the improved technique within the electronic environment shown in FIG. 1.

FIG. 3 illustrates a flowchart 90 describing a process that may be performed in an embodiment in accordance with techniques herein. In the flowchart 90, the process comprises processing steps that are summarized in individual blocks. The steps may be performed in hardware, or as processor-executable instructions that may be executed by a processor or processing circuitry. Furthermore, the steps may, but need not necessarily, be implemented by the authentication server 12 of FIGS. 1 and 2.

In step 91, in response to receiving an authentication request originating from a first device, a proximity threshold is selected representing a distance by which the first device and a second device can be separated without impacting authentication. The selection of the proximity threshold being dependent on one or more environmental factors associated with the first device. In step 92, a distance between the first device and the second device is determined. In step 93, a comparison is performed between the proximity threshold and the distance to produce a comparison result indicating whether the first device is proximate to the second device. In step 94, based on the comparison result, a determination is made whether to grant authentication such that at least one factor in the determination is the proximity of the first and the second devices.

While various embodiments of the invention have been particularly shown and described, it will be understood by those skilled in the art that various changes in form and details may be made therein without departing from the spirit and scope of the invention as defined by the appended claims.

For example, the distance between the computer 18 and the mobile phone 20 may also be determined, for example, using time-based measurements based on the amount of time it takes the radio signal to travel between transmitter and receiver and distances may be measured using one or more of a variety of different techniques. For example, time-based techniques known in the art include time of flight (TOF), time of difference of arrival (TODA) and angle of arrival. The foregoing may all be referred to as time-based schemes because they are all based on the measurement of the propagation time of a radio signal from one location to another or the difference in arrival time of a radio signal at different locations.

Further, it should be understood that computer 18 and mobile phone 20 are particular examples of devices that user 38 may use in communicating with authentication server 12. User 38 may use any combination of devices, mobile or otherwise, for such communication. Moreover, such inter-device communications may take place over wireless communications, as described above, or over a wired network, such as Ethernet, token ring, or the like.

Furthermore, it should be understood that some embodiments are directed to authentication server 12, which is constructed and arranged to authenticate a user requesting access to resources. Some embodiments are directed to a process of authenticating a user requesting access to resources. Also, some embodiments are directed to a computer program product which enables computer logic to authenticate a user requesting access to resources.

In some arrangements, authentication server 12 is implemented by a set of processors or other types of control/processing circuitry running software. In such arrangements, the software instructions can be delivered, within authentication server 12, respectively (see FIG. 2), in the form of a computer program product 110, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method, comprising:
    setting, by processing circuitry, a proximity threshold indicating a user is proximate to a first device;
    determining, by processing circuitry, a behavior characteristic of the user;
    based on the behavior characteristic, adjusting, by processing circuitry, the proximity threshold;
    submitting, by a third device, a request to access a computerized resource;
    determining, by processing circuitry, a first distance between the first device and a second device and a second distance between the second device and the third device, wherein distance between the first and the second devices is determined based on a signal strength associated with a communication between the first and the second devices;
    performing, by processing circuitry, a comparison between the first distance and the adjusted proximity threshold, and the second distance and the adjusted proximity threshold;
    based on the comparison, determining that the second device is within the adjusted proximity threshold of the third device, and the first device is not within the adjusted proximity threshold of the second device; and
    based on the determination, performing, by processing circuitry, an auto-lock in connection with the third device such that access to the computerized resource is prohibited via the third device.

2. The method as claimed in claim 1, wherein the proximity threshold is set based on one or more environmental factors relating to wireless networks discoverable by the first device.

3. The method as claimed in claim 1, wherein the proximity threshold is set based on one or more environmental factors relating to radio stations resolvable by the first device.

4. The method as claimed in claim 1, wherein the proximity threshold is set based on one or more environmental factors relating to Global Positioning System (GPS) satellites detectable by the first device.

5. The method as claimed in claim 1, wherein the proximity threshold is set relative to the signal strength also dependent on at least one of the one or more environmental factors associated with the first device such that the signal strength acts as a baseline.

6. An apparatus, comprising:
    memory; and
    processing circuitry coupled to the memory, the memory storing instructions which, when executed by the processing circuitry, cause the processing circuitry to:
    set a proximity threshold indicating a user is proximate to a first device;
    determine a behavior characteristic of the user;
    based on the behavior characteristic, adjust the proximity threshold;
    submit, by a third device, a request to access a computerized resource;
    determine, by processing circuitry, a first distance between the first device and a second device and a second distance between the second device and the third device, wherein distance between the first and the second devices is determined based on a signal strength associated with a communication between the first and the second devices;
    perform, by processing circuitry, a comparison between the first distance and the adjusted proximity threshold, and the second distance and the adjusted proximity threshold;
    based on the comparison, determine that the second device is within the adjusted proximity threshold of the third device, and the first device is not within the adjusted proximity threshold of the second device; and
    based on the determination, perform, by processing circuitry, an auto-lock in connection with the third device such that access to a computerized resource is prohibited via the third device.

7. The apparatus as claimed in claim 6, wherein the proximity threshold is set based on one or more environmental factors relating to wireless networks discoverable by the first device.

8. The apparatus as claimed in claim 6, wherein the proximity threshold is set based on one or more environmental factors relating to radio stations resolvable by the first device.

9. The apparatus as claimed in claim 6, wherein the proximity threshold is set based on one or more environmental factors relating to Global Positioning System (GPS) satellites detectable by the first device.

10. The apparatus as claimed in claim 6, wherein the proximity threshold is set relative to the signal strength also dependent on at least one of the one or more environmental factors associated with the first device such that the signal strength acts as a baseline.

11. A computer program product having a non-transitory computer readable medium which stores a set of instructions, the set of instructions, when carried out by processing circuitry, causing the processing circuitry to perform a method, the method comprising:
    setting a proximity threshold indicating a user is proximate to a first device;
    determining a behavior characteristic of the user;
    based on the behavior characteristic, adjusting the proximity threshold;
    submitting, by a third device, a request to access a computerized resource;
    determining, by processing circuitry, a first distance between the first device and a second device and a second distance between the second device and the third device, wherein distance between the first and the second devices is determined based on a signal strength associated with a communication between the first and the second devices;

performing, by processing circuitry, a comparison between the first distance and the adjusted proximity threshold, and the second distance and the adjusted proximity threshold;

based on the comparison, determining that the second device is within the adjusted proximity threshold of the third device, and the first device is not within the adjusted proximity threshold of the second device; and based on the determination, performing, by processing circuitry, an auto-lock in connection with the third device such that access to a computerized resource is prohibited via the third device.

12. The computer program product as claimed in claim 11, wherein the proximity threshold is set based on one or more environmental factors relating to wireless networks discoverable by the first device.

13. The computer program product as claimed in claim 11, wherein the proximity threshold is set based on one or more environmental factors relating to radio stations resolvable by the first device.

14. The computer program product as claimed in claim 11, wherein the proximity threshold is set based on one or more environmental factors relating to Global Positioning System (GPS) satellites detectable by the first device.

15. The computer program product as claimed in claim 11, wherein the proximity threshold is set relative to the signal strength also dependent on at least one of the one or more environmental factors associated with the first device such that the signal strength acts as a baseline.

* * * * *